U S011782216B2

(12) United States Patent
Namekawa et al.

(10) Patent No.: US 11,782,216 B2
(45) Date of Patent: Oct. 10, 2023

(54) OPTICAL CONNECTOR AND OPTICAL CONNECTOR MANUFACTURING METHOD

(71) Applicant: Orbray Co., Ltd., Tokyo (JP)

(72) Inventors: Tsuyoshi Namekawa, Tokyo (JP); Masahiro Abumi, Tokyo (JP); Satoshi Kano, Tokyo (JP); Keishiro Komatsu, Tokyo (JP)

(73) Assignee: Orbray Co., Ltd., Tokyo (JP)

( * ) Notice: Subject to any disclaimer, the term of this patent is extended or adjusted under 35 U.S.C. 154(b) by 18 days.

(21) Appl. No.: 17/493,288

(22) Filed: Oct. 4, 2021

(65) Prior Publication Data

US 2022/0026641 A1 Jan. 27, 2022

Related U.S. Application Data

(63) Continuation of application No. PCT/JP2020/016139, filed on Apr. 10, 2020.

(30) Foreign Application Priority Data

Apr. 11, 2019 (JP) .................... 2019-075286

(51) Int. Cl.
*G02B 6/26* (2006.01)
*G02B 6/38* (2006.01)
(Continued)

(52) U.S. Cl.
CPC ............ *G02B 6/264* (2013.01); *G02B 6/262* (2013.01); *G02B 6/381* (2013.01); *G02B 6/3885* (2013.01);
(Continued)

(58) Field of Classification Search
CPC ........ G02B 6/264; G02B 6/262; G02B 6/381; G02B 6/3885; G02B 6/40; G02B 6/3801; G02B 2006/1219
See application file for complete search history.

(56) References Cited

U.S. PATENT DOCUMENTS 7,641,821 B2 * 1/2010 Oe .................. G02B 6/138
264/1.27
7,949,219 B1 * 5/2011 Karras ................. G02B 6/26
385/50

(Continued)

FOREIGN PATENT DOCUMENTS

CN 100339732 C * 9/2007 ............. G02B 6/138
EP 1083448 B1 * 11/2004 ........... G02B 6/3835
(Continued)

OTHER PUBLICATIONS

Mikami et al., "Self-Written Waveguide Technology with Light-Curable Resin for Easy Optical Interconnection", Transactions of the Japan Institute of Electronics Packaging, vol. 7, No. 1, 2014, pp. 46-51) (Year: 2014).*

(Continued)

*Primary Examiner* — Michelle R Connelly
(74) *Attorney, Agent, or Firm* — Rankin, Hill & Clark LLP

(57) ABSTRACT

An optical connector includes: at least a ferrule and n self-forming optical waveguides, wherein the ferrule includes n optical fiber insertion holes, and optical fibers are each inserted into and included in the optical fiber insertion holes, the number n indicates a natural number not including zero, there are variations in an angle of each optical fiber in a core axial direction and a core gap between adjacent ones of the optical fibers, an end surface of the ferrule is formed with roundness, and end portions of the self-forming optical waveguides are each optically connected to the optical fibers.

12 Claims, 15 Drawing Sheets

(51) Int. Cl.
    *G02B 6/40*      (2006.01)
    *G02B 6/12*      (2006.01)

(52) U.S. Cl.
    CPC .............. *G02B 6/40* (2013.01); *G02B 6/3801* (2013.01); *G02B 2006/1219* (2013.01)

(56) References Cited

U.S. PATENT DOCUMENTS

| | | | |
|---|---|---|---|
| 2005/0117845 A1 | 6/2005 | Hirose | |
| 2007/0269164 A1* | 11/2007 | Hirose | C03C 25/105 385/50 |
| 2016/0077288 A1* | 3/2016 | Watte | G02B 6/3846 264/1.27 |
| 2016/0154192 A1 | 6/2016 | Ladouceur et al. | |
| 2016/0349455 A1* | 12/2016 | Amb | G02B 1/045 |
| 2018/0024295 A1 | 1/2018 | Missinne et al. | |

FOREIGN PATENT DOCUMENTS

| | | | | |
|---|---|---|---|---|
| EP | 2333596 A1 * | 6/2011 | ............. | B82Y 20/00 |
| EP | 3182184 A1 * | 6/2017 | ............. | G02B 6/138 |
| JP | 9-113761 A | 5/1997 | | |
| JP | 09197196 A * | 7/1997 | | |
| JP | 09-510801 A * | 10/1997 | | |
| JP | 2004-4487 A | 1/2004 | | |
| JP | 2004145140 A * | 5/2004 | | |
| JP | 2010-145767 A | 7/2010 | | |
| JP | 2010145767 A * | 7/2010 | | |
| JP | 2017-507357 A | 3/2017 | | |

OTHER PUBLICATIONS

Yoshimura et al., "Micro/nanoscale self-aligned optical couplings of the self-organized lightwave network (SOLNET) formed by excitation lights from outside", Optics Communications 383 (2017) 119-131) (Year: 2017).*

Malallah et al. "Controlling the trajectories of self-written waveguides in photopolymer", Journal of the Optical Society of America B, vol. 35, No. 8, Aug. 2018, pp. 2046-2056) (Year: 2018).*

Ibrahim et al. ("New Technology to Expose Core from Fiber for Optical Sensing Application", Proc. of the 2017 IEEE Region 10 Conference (TENCON), Malasia, Nov. 5-8, 2017) (Year: 2017).*

JP 09-510801 A, Machine Translation, Oct. 28, 1997. (Year: 1997).*

Abe et al. ("Multi-core Fiber Connector Technology for Low-loss Physical-contact Connection", NTT Technical Review, vol. 15, No. 6 , Jun. 2017, pp. 1-6) (Year: 2017).*

Suematsu, Machine Translation of JP-2004145140-A, May 2004. (Year: 2004).*

Otaka, Machine Translation of JP 2010-145767 A, Jul. 2010. (Year: 2010).*

International Search Report (ISR) dated Jun. 23, 2020 filed in PCT/JP2020/016139.

* cited by examiner

US 11,782,216 B2

OPTICAL CONNECTOR AND OPTICAL CONNECTOR MANUFACTURING METHOD

CROSS-REFERENCE TO RELATED APPLICATION

The present application is a continuation application of International Application No. PCT/JP2020/016139, filed on Apr. 10, 2020, which claims priority to Japanese Patent Application No. 2019-075286, filed on Apr. 11, 2019. The contents of these applications are incorporated herein by reference in their entirety.

BACKGROUND

1. Technical Field

One aspect of the present disclosure relates to an optical connector and an optical connector manufacturing method.

2. Related Art

An optical cable using an optical fiber can perform high-speed communication of a mass of information, and therefore, has been utilized for domestic or industrial information communication. For example, an automobile is equipped with various electric components (e.g., a car navigation system), and an optical cable has been used for optical communication of these electric components. Various optical connectors have been proposed, which include an optical connector (an optical waveguide) configured such that one end of the optical fiber is optically connected (connected so that an optical signal can be transmitted) to multiple optical elements such as photodiodes and an optical connector configured such that end portions of multiple optical fibers are optically connected to each other.

These optical connectors include, for example, one described in JP-A-9-113761. The optical connector described in JP-A-9-113761 includes a pin-equipped ferrule (described as a "ferrule assembly" in JP-A-9-113761) and a hole-equipped ferrule (described as a "ferrule assembly" in JP-A-9-113761). The pin-equipped ferrule is a resin molded component, and has a guide pin as a reference and four optical fiber insertion holes. On the other hand, the hole-equipped ferrule is also a resin molded component, and has a guide pin insertion hole into which a guide pin is to be inserted and four optical fiber insertion holes. The guide pin of the pin-equipped ferrule is inserted into the guide pin insertion hole of the hole-equipped ferrule, and in this manner, these two ferrules are optically connected to each other with surfaces thereof facing each other.

SUMMARY

An optical connector includes at least a ferrule and n self-forming optical waveguides, wherein the ferrule includes n optical fiber insertion holes, and optical fibers are each inserted into and included in the optical fiber insertion holes, the number n indicates a natural number not including zero, there are variations in an angle of each optical fiber in a core axial direction and a core gap between adjacent ones of the optical fibers, an end surface of the ferrule is formed with roundness, and end portions of the self-forming optical waveguides are each optically connected to the optical fibers.

DETAILED DESCRIPTION

Figure 1:
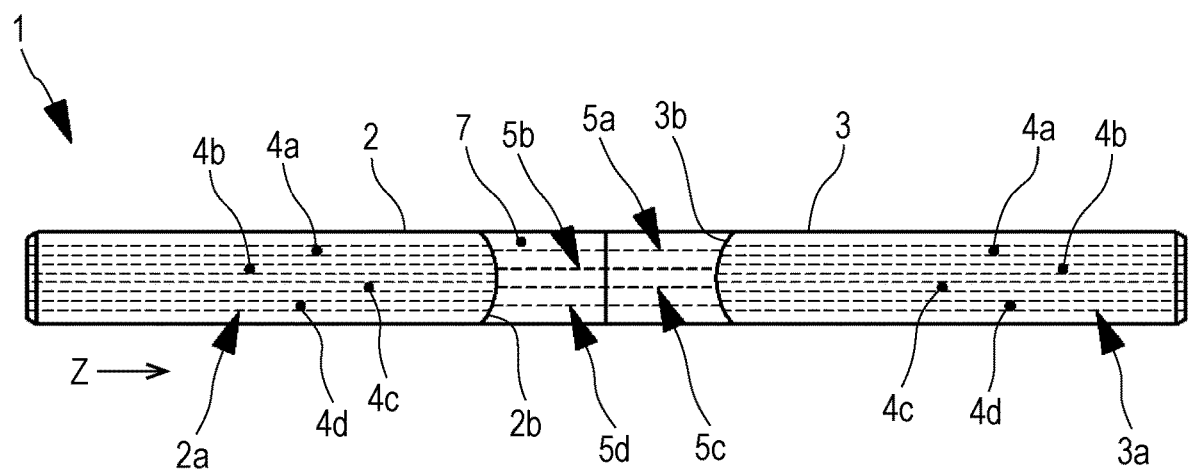
FIG. 1 is a schematic view of an optical connector according to a first embodiment of the present disclosure.
Figure 2:
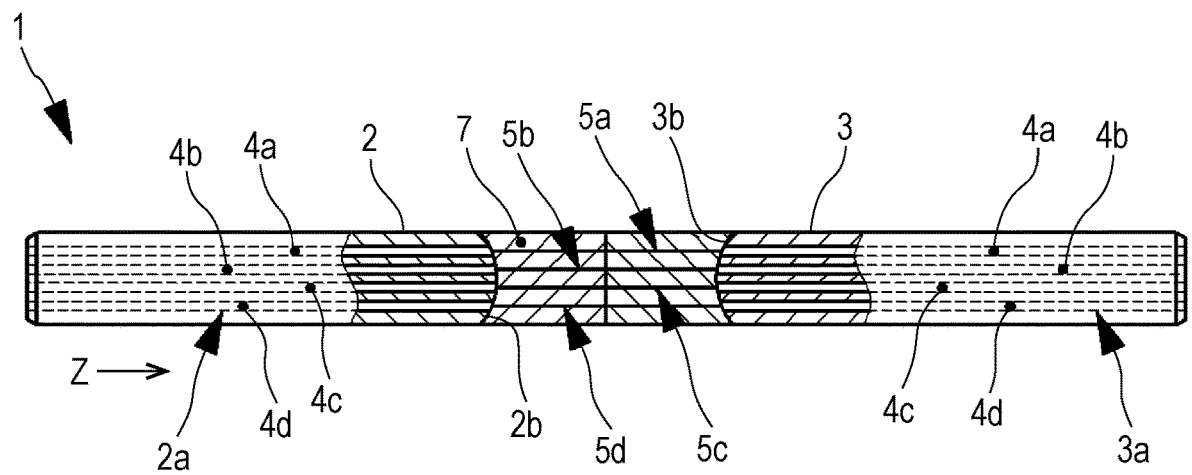
FIG. 2 is a sectional view showing cut portions of part of ferrules and self-forming optical waveguides and dads thereof in the optical connector of FIG. 1.
Figure 3A:
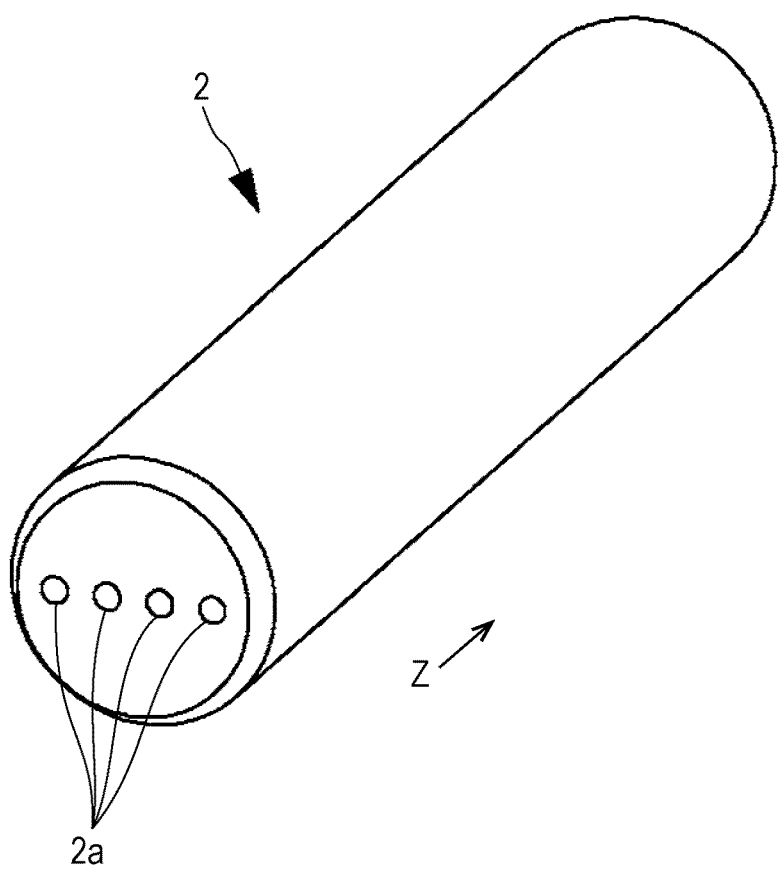
FIGS. 3A and 3B are perspective views schematically showing the ferrule used for the optical connector of the first embodiment of the present disclosure.
Figure 3B:
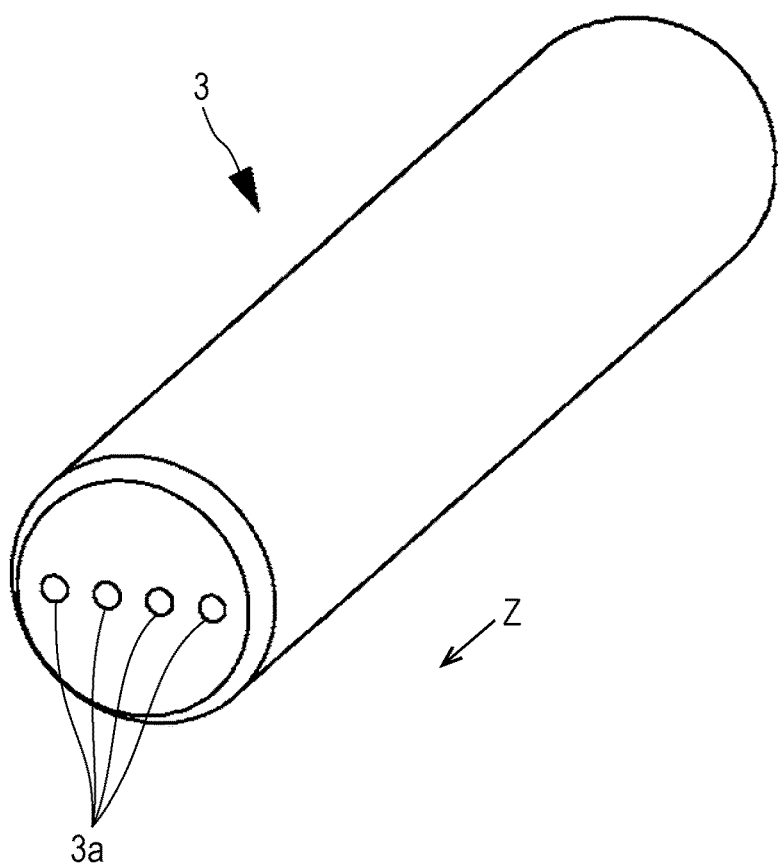

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the actually-manufactured ferrule, there is a variation in an angle in an axial direction of each optical fiber insertion hole. Further, there is also a variation in a gap between the center points of the optical fiber insertion holes.

Further, when an end surface of the ferrule is polished, the end surface is not formed as a flat surface, but is formed in a rounded shape (polishing sagging). Due to such roundness, a clearance is formed between the optical element and the ferrule and between two ferrules.

Due to each of the above-described variations, an error in the arrangement accuracy of each optical fiber inserted into the ferrule is caused. Due to the roundness of the end surface of the ferrule, a clearance (an air gap) is caused between the fibers connected to each other. For this reason, desired optical connection between the optical element and the optical fiber and between the optical fibers is not achieved, leading to a connection loss.

For reducing the connection loss, a high accuracy is required for arrangement of each optical fiber of the ferrule with respect to the optical elements and arrangement of the optical fibers of two ferrules. However, in the actually-produced ferrule, the above-described various variations and the above-described roundness of the end surface are inevitably caused. For this reason, it is difficult to enhance the arrangement accuracy, assuming that these ferrules are used.

Figure 18A:
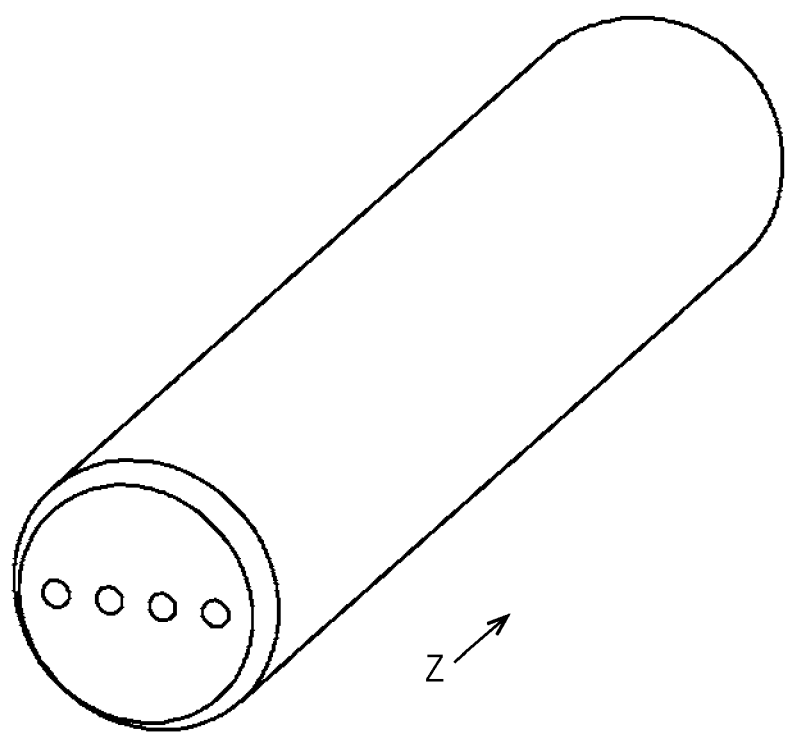
FIGS. 18A and 18B are views for describing a ferrule used in a typical optical connector and the state of a variation in the angle of the ferrule in a rotation direction thereof.
Figure 18B:
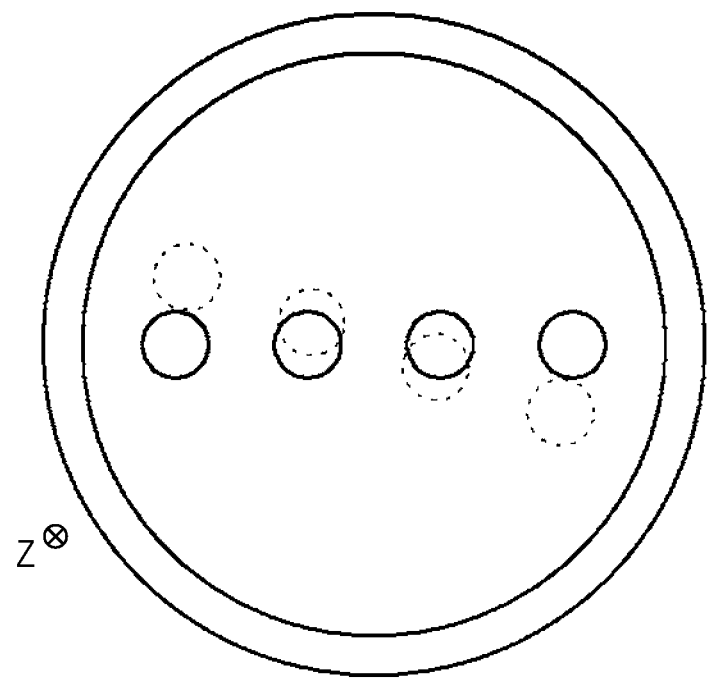

Further, as shown in FIG. 18B, the variation in the angle of the optical fiber insertion hole in the rotation direction in the ferrule relatively increases toward an outer peripheral side of the ferrule. Thus, a position shift increases, and an optical loss increases. FIG. 18A shows a ferrule used in a typical optical connector. Moreover, FIG. 18B shows the original positions of optical fiber insertion holes of the ferrule shown in FIG. 18A by solid circles, and shows the shifted position of each optical fiber insertion hole due to the variation in the angle by dashed lines.

One object of the present disclosure is to provide the following optical connector and the method for manufacturing such an optical connector. With this optical connector, the connection loss can be easily reduced while use of the ferrule having the variation in the angle of each optical fiber insertion hole in the axial direction, the variation in the gap between the center points of the optical fiber insertion holes, or the roundness of the end surface is acceptable.

An optical connector (the present optical connector) according to one aspect of the present disclosure includes: at least a ferrule and n self-forming optical waveguides, wherein the ferrule includes n optical fiber insertion holes, and optical fibers are each inserted into and included in the optical fiber insertion holes, the number n indicates a natural number not including zero, there are variations in an angle of each optical fiber in a core axial direction and a core gap between adjacent ones of the optical fibers, an end surface of the ferrule is formed with roundness, and end portions of the self-forming optical waveguides are each optically connected to the optical fibers.

An optical connector manufacturing method (the present manufacturing method) according to one aspect of the present disclosure includes: preparing two ferrules and photo-curing resin, each ferrule including at least n optical fiber insertion holes and including optical fibers in the optical fiber insertion holes, the optical fibers being inserted therein; arranging the two ferrules to face each other and arranging the photo-curing resin between the ferrules; confirming that there are variations in an angle of each optical fiber in a core axial direction and a core gap between adjacent ones of the optical fibers, an end surface of one of the ferrules is formed with roundness, and an end surface of the other ferrule is formed with no roundness; curing end portions of the photo-curing resin with the core gap by incident light entering the end portions of the photo-curing resin from the optical fibers, thereby transferring the core gap onto the photo-curing resin and forming the n self-forming optical waveguides at the photo-curing resin such that a variation in the core gap on one end side of the self-forming optical waveguides is smaller than a variation in the core gap on the other end side; forming a clad by curing of the photo-curing resin; and detaching the other ferrule from the self-forming optical waveguides, thereby forming a ferrule body including the one of the ferrules and the self-forming optical waveguides, wherein the number n indicates a natural number not including zero.

According to the present optical connector and the present manufacturing method, the pre-detached ferrule forms the self-forming optical waveguides in a state in which the variation in the core gap on one end side of the self-forming optical waveguides is smaller than the variation in the core gap on the other end side. Thus, a loss in connection among the self-forming optical waveguides and the optical fibers in the ferrule on one end side can be reduced. Further, use of the ferrule having the variation in the angle of each optical fiber insertion hole in the axial direction, the variation in the gap between the center points of adjacent ones of the optical fiber insertion holes, or the roundness of the end surface is acceptable, and on the other hand, the optical connector can include the self-forming optical waveguides and the optical fibers and the end portions of the self-forming optical waveguides can be favorably connected to each other. Further, the connection loss can be easily reduced, and improvement in the yield of the optical connector and reduction in a manufacturing cost accompanied by such improvement can be achieved.

Further, the detached ferrule can be, as a master ferrule, repeatedly used for the step of manufacturing another optical connector. The highly-accurate ferrule with smaller various variations and roundness is detached and repeatedly used, and therefore, the self-forming optical waveguides can be manufactured with the highly-accurate constant core gap in the ferrule detached from the end portions of the self-forming optical waveguides. Thus, the end portions of the self-forming optical waveguides duplicated with the same core gap by the master ferrule are optically connected to each other. Thus, on this point, the connection loss of the optical connector can be also easily reduced.

An optical connector according to the first aspect of the present embodiment includes: at least a ferrule and n self-forming optical waveguides, wherein the ferrule includes n optical fiber insertion holes, and optical fibers are each inserted into and included in the optical fiber insertion holes, the number n indicates a natural number not including zero, there are variations in an angle of each optical fiber in a core axial direction and a core gap between adjacent ones of the optical fibers, an end surface of the ferrule is formed with roundness, and end portions of the self-forming optical waveguides are each optically connected to the optical fibers.

According to the optical connector according to the second aspect of the present embodiment, in the optical connector according to the first aspect, the ferrule includes two ferrules, the two ferrules are arranged facing each other, and the self-forming optical waveguides are provided between the two ferrules, each of the two ferrules includes n optical fiber insertion holes, and the optical fibers are each inserted into and included in the optical fiber insertion holes, there are variations in an angle of each optical fiber in a core axial direction and a core gap between adjacent ones of the optical fibers, end surfaces of the two ferrules are formed with roundness, the n self-forming optical waveguides are divided in half along a direction perpendicular to a light propagation direction, and a core gap between adjacent ones of the self-forming optical waveguides at end surfaces thereof is identical among the divided self-forming optical waveguides.

An optical connector according to a third aspect of the present embodiment is that the optical connector of the first aspect further includes an optical element and the self-forming optical waveguides being provided between the optical element and the ferrule.

According to the above configurations, the pre-detached ferrule forms the self-forming optical waveguides in a state in which the variation in the core gap on one end side of the self-forming optical waveguides is smaller than the variation in the core gap on the other end side. Thus, a loss in connection among the self-forming optical waveguides and the optical fibers in the ferrule on one end side can be reduced. Further, use of the ferrule having the variation in the angle of each optical fiber insertion hole in the axial direction, the variation in the gap between the center points of the optical fiber insertion holes, or the roundness of the end surface is acceptable, and on the other hand, the optical connector can include the self-forming optical waveguides and the optical fibers and the end portions of the self-forming optical waveguides can be favorably connected to each other. Further, the connection loss can be easily reduced, and improvement in the yield of the optical connector and reduction in a manufacturing cost accompanied by such improvement can be achieved.

An optical connector manufacturing method according to the fourth aspect of the present embodiment includes: preparing two ferrules and photo-curing resin, each ferrule including at least n optical fiber insertion holes and including optical fibers in the optical fiber insertion holes, the optical fibers being inserted therein; arranging the two ferrules to face each other and arranging the photo-curing resin between the ferrules; confirming that there are variations in an angle of each optical fiber in a core axial direction and a core gap between adjacent ones of the optical fibers, an end surface of one of the ferrules is formed with roundness, and an end surface of the other ferrule is formed with no roundness; curing end portions of the photo-curing resin with the core gap by incident light entering the end portions of the photo-curing resin from the optical fibers, thereby transferring the core gap onto the photo-curing resin and forming the n self-forming optical waveguides at the photo-curing resin such that a variation in the core gap on one end side of the self-forming optical waveguides is smaller than a variation in the core gap on the other end side; forming a clad by curing of the photo-curing resin; and detaching the other ferrule from the self-forming optical waveguides, thereby forming a ferrule body including the one of the ferrules and the self-forming optical waveguides, wherein the number n indicates a natural number not including zero.

The optical connector manufacturing method according to the fifth aspect of the present embodiment, further includes, in the optical connector manufacturing method according to the fourth aspect: preparing another ferrule and another photo-curing resin, the another ferrule including n optical fiber insertion holes and including optical fibers in the optical fiber insertion holes, the optical fibers inserted therein; further forming other self-forming optical waveguides by the optical connector manufacturing method according to the fourth aspect by means of the detached other ferrule; forming another ferrule body including the another ferrule and the other self-forming optical waveguides; and optically connecting the self-forming optical waveguides and the other self-forming optical waveguides to each other.

An optical connector manufacturing method according to a sixth aspect of the present embodiment is that the optical connector manufacturing method of the fourth aspect further includes preparing an optical element and optically connecting the self-forming optical waveguides and the optical element to each other.

In addition to the above effect, according to the configurations and the manufacturing methods, the detached ferrule can be, as a master ferrule, repeatedly used for the step of manufacturing another optical connector. The highly-accurate ferrule with smaller various variations and roundness is detached and repeatedly used, and therefore, the self-forming optical waveguides can be manufactured with the highly-accurate constant core gap in the ferrule detached from the end portions of the self-forming optical waveguides. Thus, the end portions of the self-forming optical waveguides duplicated with the same core gap by the master ferrule are optically connected to each other. Thus, on this point, the connection loss of the optical connector can be also easily reduced.

An optical connector manufacturing method according to a seventh aspect of the present embodiment is that the optical connector manufacturing method of any one of the fourth to sixth aspects further includes applying a mold release agent to the other ferrule in advance.

According to this manufacturing method, the mold release agent is applied so that loss of the end portions of the self-forming optical waveguides upon detachment of the ferrule can be reduced. Thus, the ferrule can be smoothly detached from the self-forming optical waveguides.

An optical connector according to an eighth aspect of the present embodiment is that in the optical connector of any one of the first to third aspects, the starting location of an axis deviation correction part of each self-forming optical waveguide on a ferrule side is different between adjacent ones of the self-forming optical waveguides.

The optical connector manufacturing method according to the ninth aspect of the present embodiment, further including in any one of the optical connector manufacturing methods of the fourth to sixth aspects: differentiating a starting location of an axis deviation correction part of each self-forming optical waveguide on a side close to the one of the ferrules between adjacent ones of the self-forming optical waveguides, and providing a time difference in a time of end of formation of the axis deviation correction part between adjacent ones of the self-forming optical waveguides.

According to these configuration and manufacturing method, optical connection among the adjacent self-forming optical waveguides can be reduced while use of the ferrule having the variation in the angle of each optical fiber insertion hole in the axial direction or the variation in the gap between the center points of the optical fiber insertion holes is acceptable. Thus, the connection loss of the optical connector can be easily reduced.

An optical connector according to a tenth aspect of the present embodiment is that in the optical connector of any one of the first to third aspects or the eighth aspect, the ferrule is held in a single split sleeve.

An optical connector manufacturing method according to an eleventh aspect of the present embodiment is that the optical connector manufacturing method of any one of the fourth to sixth aspects and the ninth aspect further includes holding the ferrules in a single split sleeve.

According to these configuration and manufacturing method, the optical connector can be formed taking an inner diameter portion of the split sleeve as a reference surface. Thus, positioning of the ferrule is facilitated.

An optical connector manufacturing method according to a twelfth aspect of the present embodiment is that the optical connector manufacturing method of any one of the fourth to sixth aspects, the ninth aspect, and the eleventh aspect further includes causing light to simultaneously enter the photo-curing resin from the n optical fibers.

According to this manufacturing method, there is no need to provide an exit time difference when the light exits from the n optical fibers into the photo-curing resin. Thus, reduction in the cost for manufacturing the optical connector and improvement in the yield of the optical connector can be achieved.

Hereinafter, a first embodiment according to the present disclosure will be described with reference to FIGS. 1 to 11, and a second embodiment will be described with reference to FIGS. 12, 13A, and 13B. First, a structure in common between an optical connector 1 of the first embodiment and an optical connector 11 of the second embodiment will be described below.

In both embodiments, each of the optical connector 1 and the optical connector 11 includes at least a ferrule 2 and n self-forming optical waveguides 5a to 5d (hereinafter referred to as optical waveguides 5a to 5d). The number n is a natural number not including zero, and n=4 is satisfied in the embodiment shown in each figure. Moreover, in the first embodiment, the optical connector 1 further includes a ferrule 3. Note that a Z-axis direction in each figure is a longitudinal direction of the ferrule 2 or 3 and is a common direction among the figures. A clad 7 is formed around each of the n optical waveguides 5a to 5d.

The ferrule 2 includes n optical fiber insertion holes 2a, and optical fibers 4a to 4d are each inserted into and included in the optical fiber insertion holes 2a. Note that the ferrule 3 also includes n optical fiber insertion holes 3a and optical fibers 4a to 4d are each inserted into and included in the optical fiber insertion holes 3a.

The ferrule 2 or 3 is made of zirconia ($ZrO_2$), and the outer shape thereof can be a circular shape as shown in FIGS. 3A and 3B or FIGS. 5A and 5B or a not-shown rectangular shape. The outer diameter of the circular shape is about 1.25 mm to 2.5 mm. In the case of the rectangular shape, a long side has a dimension of about 1.25 mm to 2.5 mm, and a short side has a dimension of equal to or smaller than that of the long side.

Figure 17A:
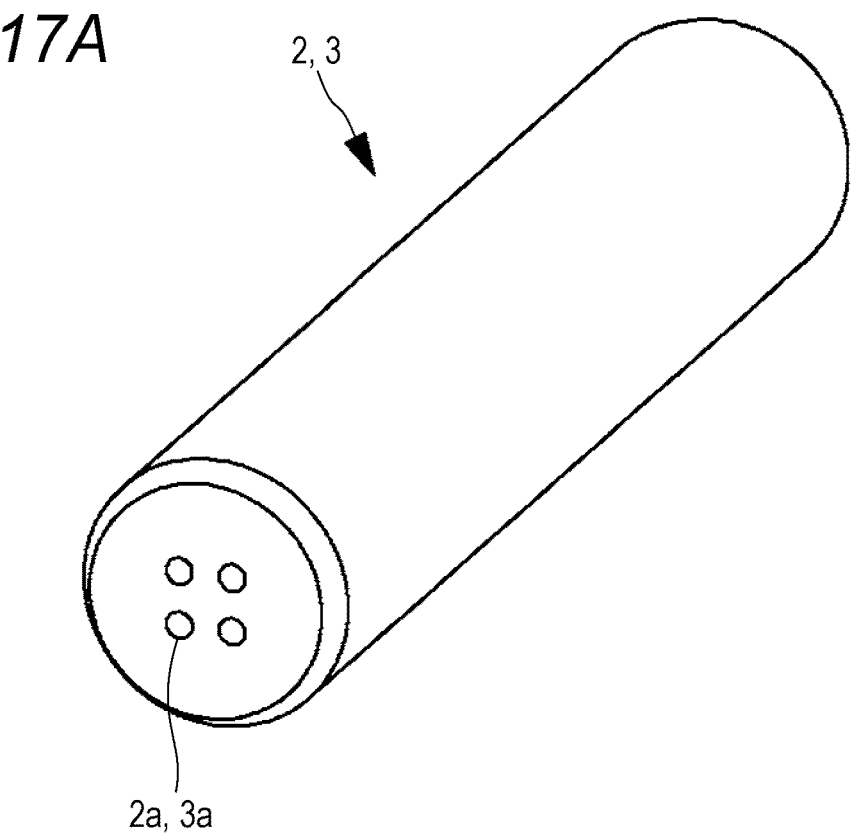
FIGS. 17A and 17B are perspective views showing a modification example of the ferrule used for the optical connector according to the embodiment of the present disclosure.
Figure 17B:
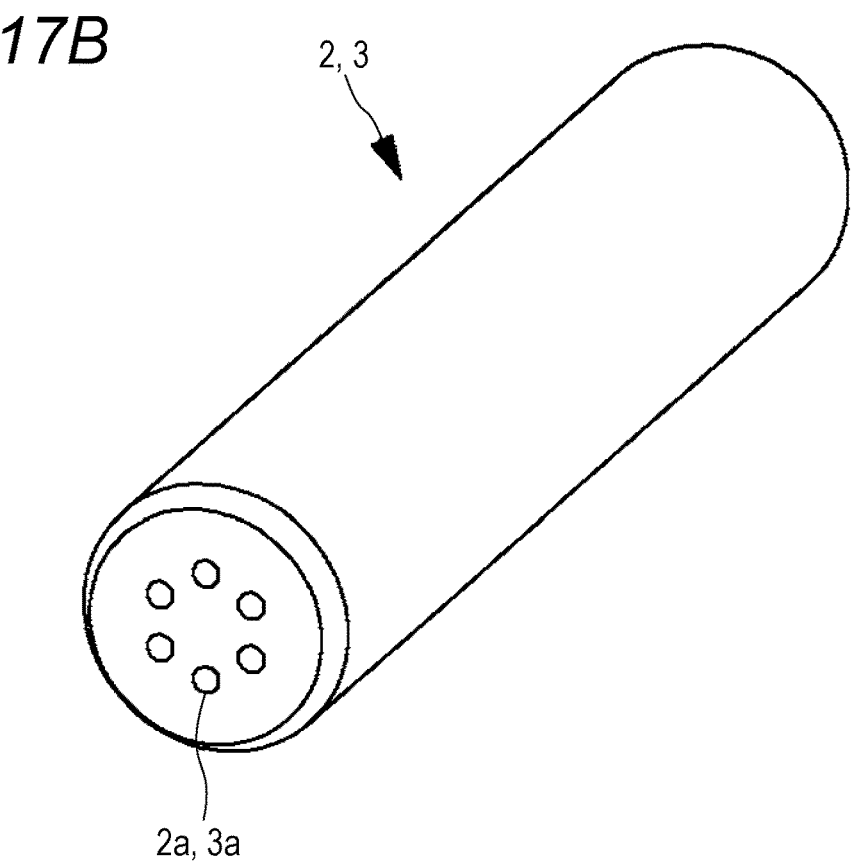

The number of optical fiber insertion holes 2a, 3a (hereinafter referred to as holes 2a, 3a) is four or six. The hole diameter of the optical fiber insertion hole 2a, 3a is slightly larger than 0.125 mm (125 μm) and equal to or smaller than about 0.2 mm, considering the above-described type of optical fiber 4a to 4d to be inserted. Arrangement of the holes 2a, 3a is one line×four holes as shown in FIGS. 3A and 3B or FIGS. 5A and 5B or two lines×two holes as shown in FIG. 17A in a case where the number of holes 2a, 3a is four. In a case where the number of holes 2a, 3a is six, the holes 2a, 3a are each arranged at the vertices of a regular hexagon as shown in FIG. 17B. A gap between the center points of adjacent ones of the holes 2a, 3a is about 0.25 mm to 0.45 mm.

Each optical fiber 4a to 4d is of a type that a clad surrounds a not-shown core, is a single mode or a multi-mode, and is any of a step index fiber or a graded index fiber. Further, each optical fiber 4a to 4d is made of glass or plastic. The outer diameter of the clad is 0.125 mm (125 μm) in the case of the single-mode optical fiber. Note that the mode field diameter of a single-mode fiber with a band of 1550 nm is 10.5 μm.

Figure 4A:
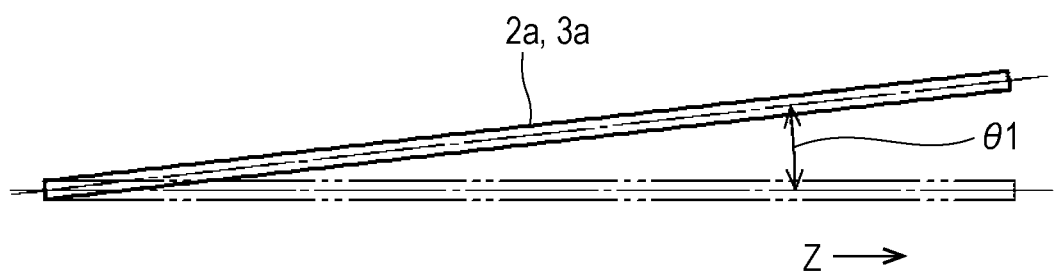
FIGS. 4A and 4B are schematic views for describing a variation in the angle of an optical fiber insertion hole of the ferrule, which is included in the optical connector according to the embodiment of the present disclosure, in an axial direction.
Figure 4B:
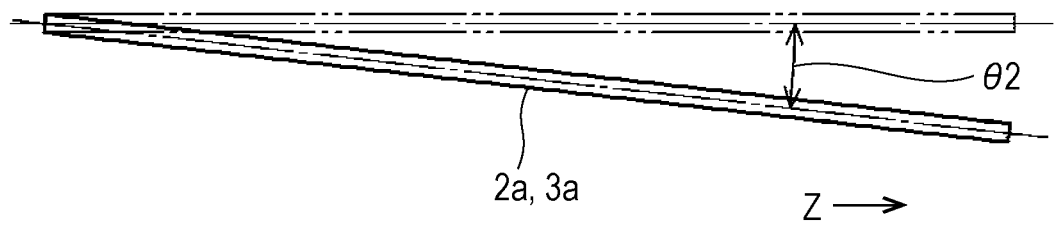
Figure 5A:
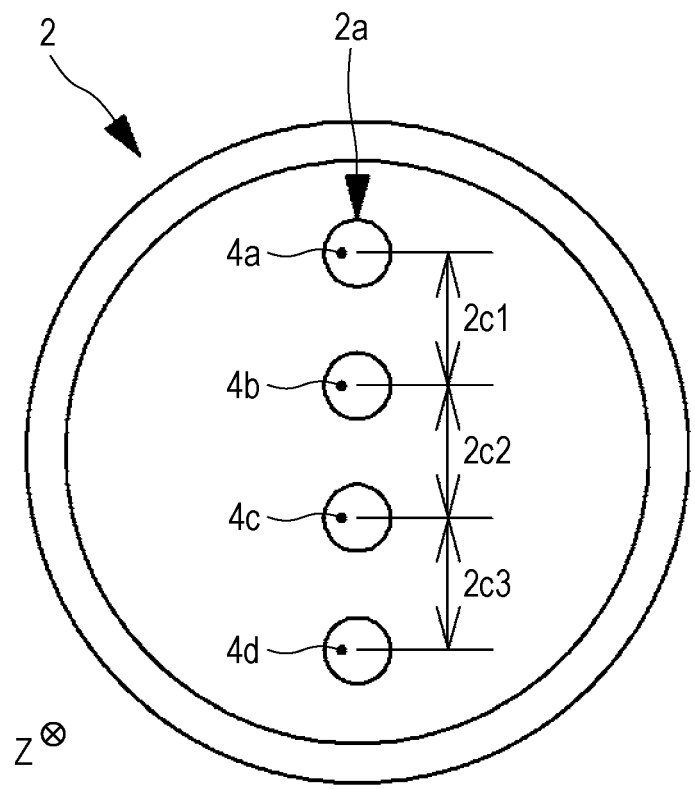
FIGS. 5A and 5B are schematic views for describing an end portion of the ferrule used for the optical connector of the first embodiment of the present disclosure.
Figure 5B:
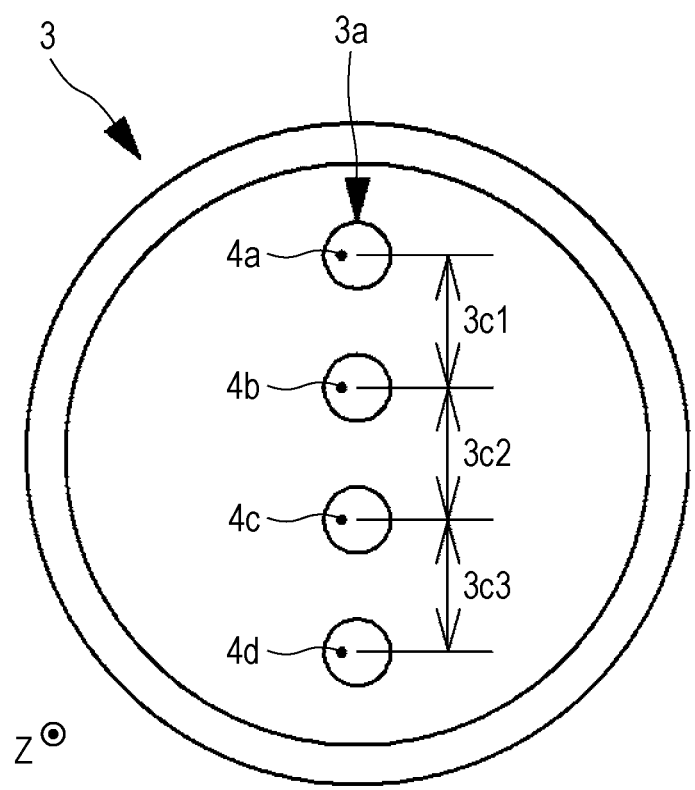
Figure 6:
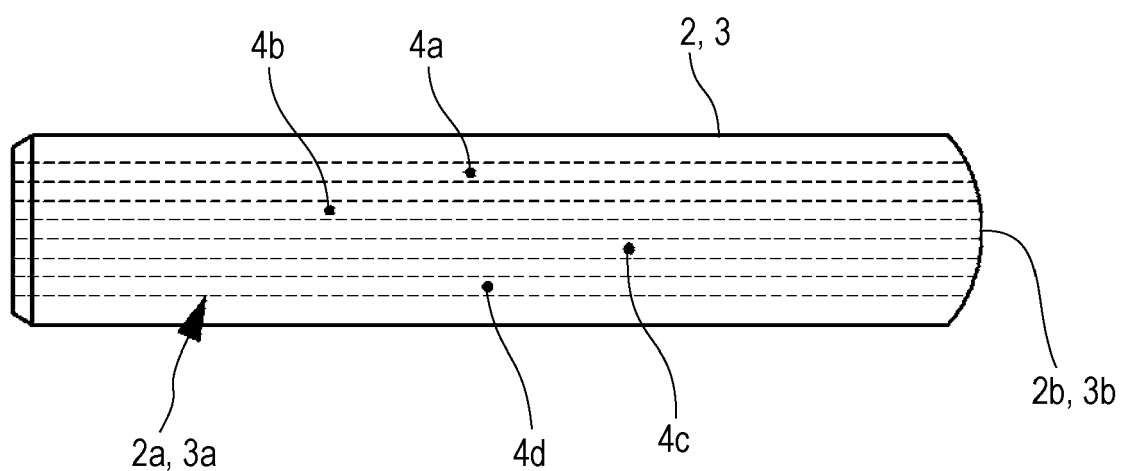
FIG. 6 is a view for describing the ferrule used for the optical connector of the embodiment of the present disclosure and the shape of an end surface of the ferrule.
Figure 7A:
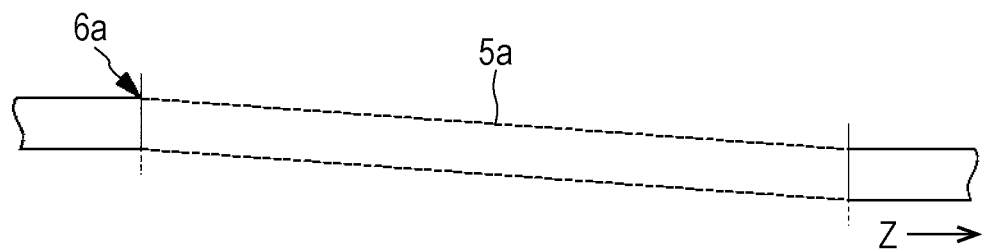
FIGS. 7A to 7D are partially-enlarged views for describing the self-forming optical waveguide of the optical connector according to the embodiment of the present disclosure.
Figure 7B:
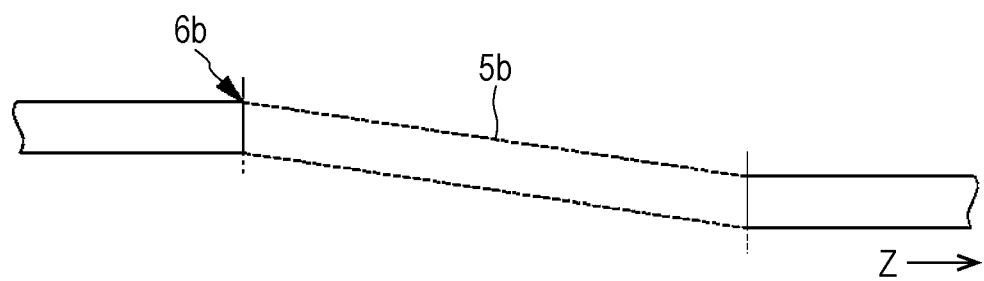
Figure 7C:
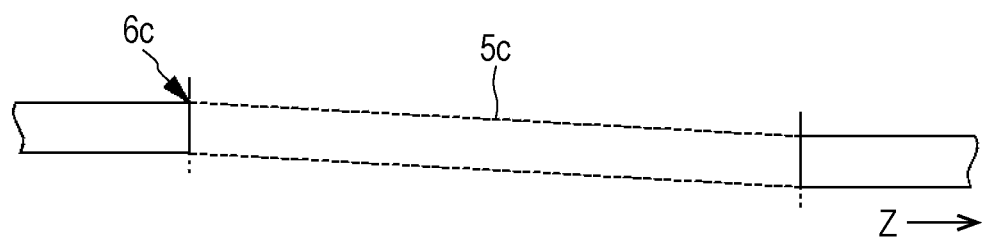
Figure 7D:
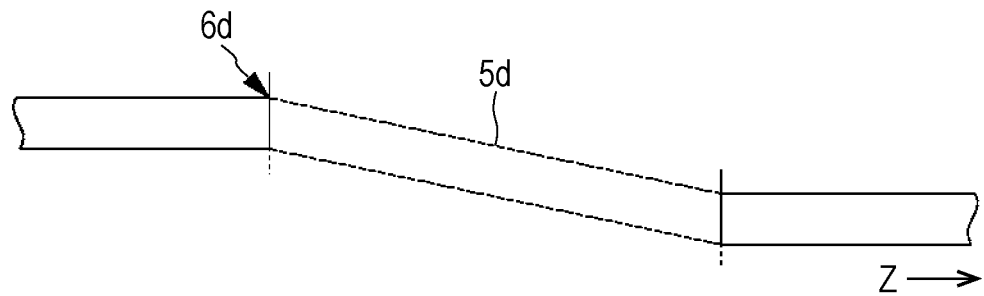

In the present embodiment, a variation $\theta1, \theta2$ in the angle of each hole 2a in an axial direction (the Z-axis direction) as shown in FIGS. 4A and 4B is acceptable. Further, a variation in a gap 2c1 to 2c3 between the center points of adjacent ones of the holes 2a as shown in FIGS. 5A and 5B and the roundness of an end surface 2b of the ferrule 2 as shown in FIG. 6 are acceptable. The entirety of the end surface 2b of the ferrule 2 is rounded by polishing. The same also applies to an end surface 3b of the ferrule 3.

In the first embodiment, a variation $\theta1, \theta2$ in the angle of each hole 3a in the axial direction (the Z-axis direction) and a variation in a gap 3c1 to 3c3 between the center points of adjacent ones of the holes 3a are also acceptable. Thus, there are variations in the angle of each optical fiber 4a to 4d inserted into the holes 2a, 3a in a core axial direction and a gap between the cores of adjacent ones of the optical fibers 4a to 4d.

One end portion of each optical waveguide 5a to 5d is optically connected to a corresponding one of the optical fibers 4a to 4d of the ferrule 2. In the first embodiment, the other end portion of each optical waveguide 5a to 5d is further optically connected to a corresponding one of the optical fibers 4a to 4d of the ferrule 3.

Further, manufacturing methods in the first and second embodiments both have the following common steps as shown in FIGS. 10A to 10D, 11, 13A, and 13B.

In the manufacturing method in each embodiment, at least two ferrules 2, 13 and photo-curing resin 10 are first prepared. The ferrule 13 also includes n optical fiber insertion holes 13a (hereinafter referred to as holes 13a), and optical fibers 4a to 4d are each inserted into and included in the optical fiber insertion holes 13a.

Figure 11:
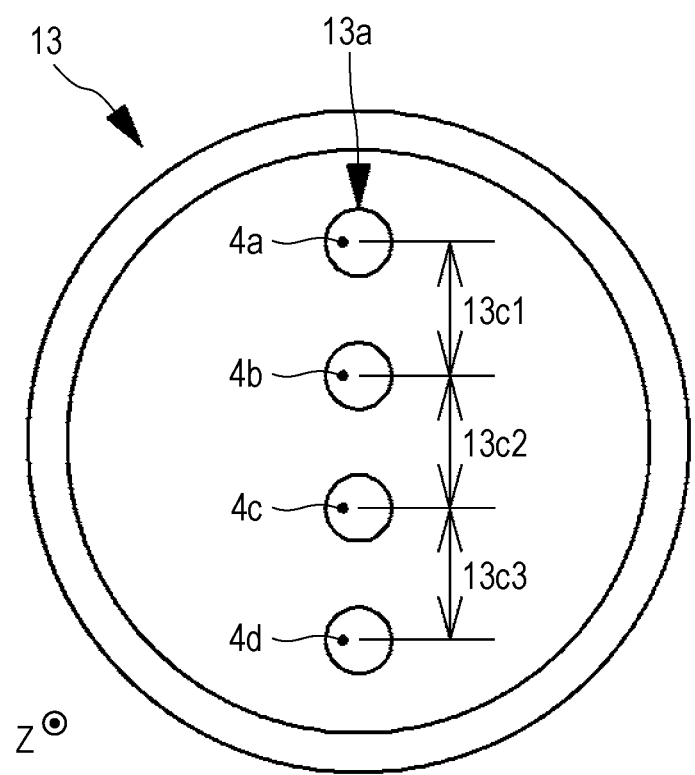
FIG. 11 is a schematic view for describing an end portion of another ferrule used in the manufacturing method shown in FIGS. 10A to 10D.

A variation $\theta1, \theta2$ in the angle of each hole 13a in the axial direction (the Z-axis direction) is also acceptable, and as shown in FIG. 11, a variation in a gap 13c1 to 13c3 between the center points of adjacent ones of the holes 13a is also acceptable. Thus, there are variations in the angle of each optical fiber 4a to 4d inserted into the hole 13a in a core axial direction and a gap between the cores of adjacent ones of the optical fibers 4a to 4d. Note that (Variation in Gap 13c1 to 13c3)<(Variation in Gap 2c1 to 2c3) is satisfied. Further, it is confirmed that the variation $\theta1, \theta2$ in the angle of each hole 13a and the variation in the gap 13c1 to 13c3 between adjacent ones of the holes 13a fall within the standards for the optical connector 1 or 11.

Note that the end surface 13b of the ferrule 13 is formed in a planar shape with no roundness as shown in FIGS. 10A to 10D. Using a not-shown dedicated tool, surface polishing is performed for an outer surface of the end surface 13b of the ferrule 13 satisfying (Variation in Gap 13c1 to 13c3)<(Variation in Gap 2c1 to 2c3). In this manner, the ferrule 13 is manufactured without the end surface 13b being rounded. On the other hand, it can be recognized that the end surface 2b is, with the roundness, greatly deformed from a planar state.

The photo-curing resin 10 is of a clad selective polymerization type. The material of the photo-curing resin 10 is a solution obtained in such a manner that a photopolymerization initiator is added to a liquid mixture of two or more types of monomer. Such a solution is polymerized and cured into polymer by incident light with such a wavelength band that the photopolymerization initiator has a sensitivity. As described above, in the present embodiment, the variation θ1, θ2 in the angle of each hole 2a, 13a, the variation in the gap 2c1 to 2c3, 13c1 to 13c3, and the roundness of the end surface 2b are acceptable. Thus, it is confirmed that there are the variations in the angle of each optical fiber 4a to 4d of the ferrule 2 in the core axial direction and the core gap between adjacent ones of the optical fibers 4a to 4d and the end surface 2b is formed with the roundness. Moreover, it is confirmed that the end surface 13b of the other ferrule 13 is formed with no roundness as described above.

Next, the photo-curing resin 10 is arranged between two ferrules 2, 13, and accordingly, is arranged on the end surface 2b and the end surface 13b. Next, light enters end portions of the photo-curing resin 10 from each optical fiber 4a to 4d, and accordingly, the end portions of the photo-curing resin 10 are polymerized and cured with the core gap (i.e., each of the above-described gaps 2c1 to 2c3, 13c1 to 13c3) between adjacent ones of the optical fibers 4a to 4d. By such polymerization curing, the core gaps (2c1 to 2c3, 13c1 to 13c3) are transferred onto the end portions of the photo-curing resin 10. The wavelength λw of the light for polymerizing and curing the photo-curing resin 10 can be set as necessary according to the photopolymerization initiator. This wavelength kw is, as one example, 365 nm to 1675 nm.

After transfer, the light continuously enters the photo-curing resin 10 from the optical fibers 4a to 4d, and accordingly, the n optical waveguides 5a to 5d are formed at the photo-curing resin 10. The core diameter of each optical waveguide 5a to 5d is preferably the same as the core diameter of each optical fiber 4a to 4d, and is preferably uniform along an optical axis direction of each optical waveguide 5a to 5d. The mode field diameter of each optical waveguide 5a to 5d is the same (10.5 μm) as that of the single-mode fiber.

As described above, (Variation in Gap 13c1 to 13c3)< (Variation in Gap 2c1 to 2c3) is satisfied. Thus, the variation in the core gap 13c1 to 13c3 on one end side (an end portion connected to the ferrule 13) of the optical waveguides 5a to 5d is smaller than the variation in the core gap 2c1 to 2c3 on the other end side (an end portion connected to the ferrule 2) of the optical waveguides 5a to 5d.

Next, the dads 7 are formed. The clad 7 is of a clad selective polymerization type. In each optical waveguide 5a to 5d, at least one type of monomer is in polymerization reaction with the wavelength kw. As a result, in the cured core region, a non-polymerization-reacted monomer component is, at the same level of concentration as that in the liquid mixture, dispersed as unreacted monomer. At the same time, only one type of monomer is consumed and polymerized in the core region. Thus, at a boundary surface between the core and the clad, a monomer concentration gradient is caused, and interdiffusion progresses. Accordingly, the function of the clad can be obtained. Finally, the entirety of the photo-curing resin 10 is irradiated with ultraviolet light (UV irradiation), and accordingly, the cores and the entirety of the dads 7 are cured and formed and the optical waveguides 5a to 5d are obtained.

Figure 10A:
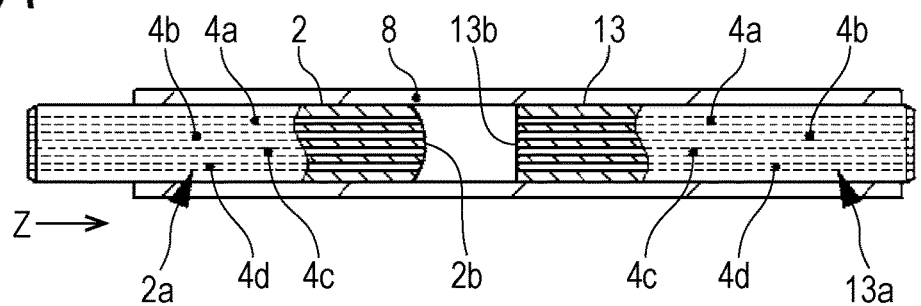
FIGS. 10A to 10D are partial sectional views schematically showing the method for manufacturing the optical connector according to the first embodiment of the present disclosure.
Figure 10B:
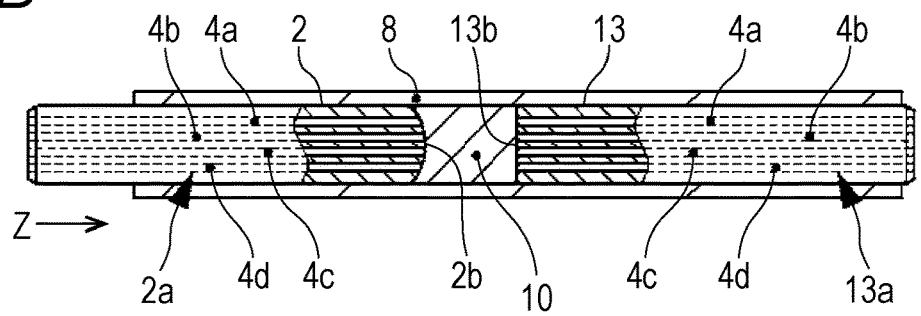
Figure 10C:
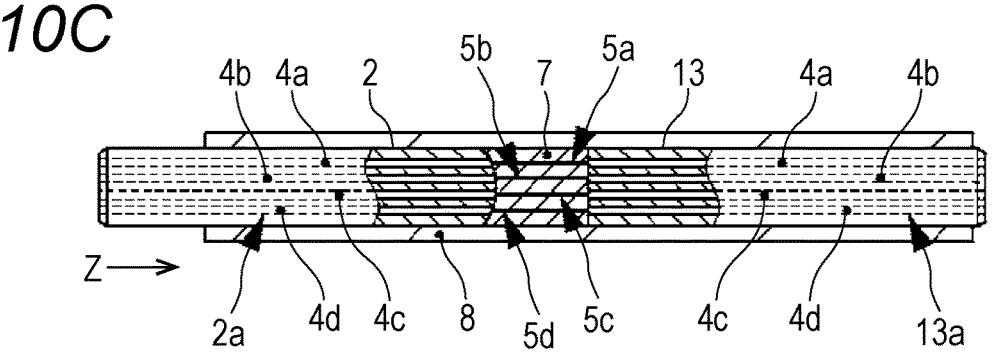
Figure 10D:
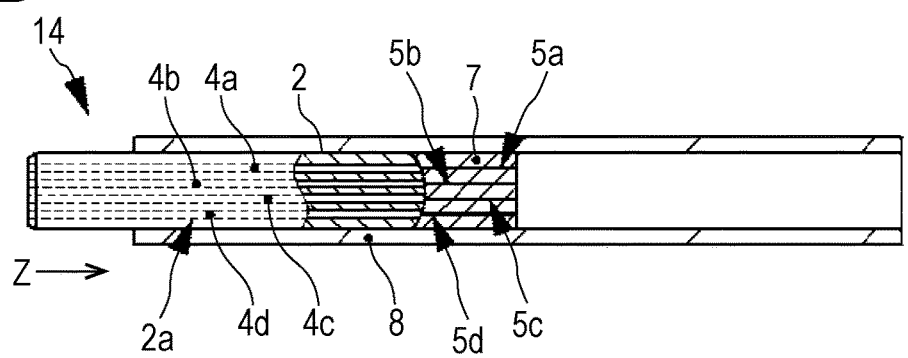

Next, as shown in FIG. 10D, the ferrule 13 is detached from the optical waveguides 5a to 5d, and in this manner, a ferrule body 14 including the ferrule 2 and the optical waveguides 5a to 5d is formed.

The detached ferrule 13 is, as a master ferrule, repeatedly used for the step of manufacturing another ferrule body. The highly-accurate ferrule 13 with smaller various variations, the planar end surface 13b, and less deformation is detached and repeatedly used, and therefore, the ferrule body 14 of which core gap between the end portions of adjacent ones of the optical waveguides 5a to 5d is a highly-accurate constant core gap (13c1 to 13c3) in the ferrule 13 can be duplicated.

The optical connector having the above-described common structure and manufactured by the common manufacturing steps will be described in more detail separately in the first and second embodiments. Note that the same contents as the description above will be omitted or simply described. First, the optical connector 1 according to the first embodiment will be described.

Figure 8:
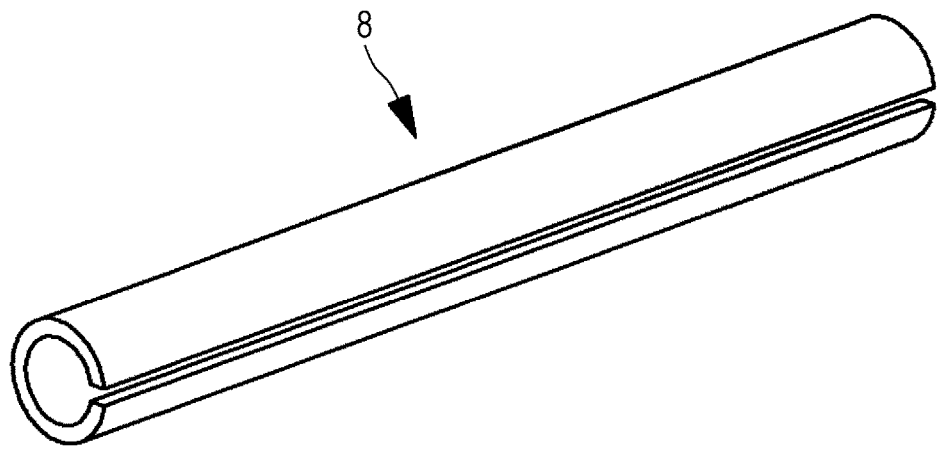
FIG. 8 is a perspective view showing a split sleeve used for the optical connector of the embodiment of the present disclosure.
Figure 9:
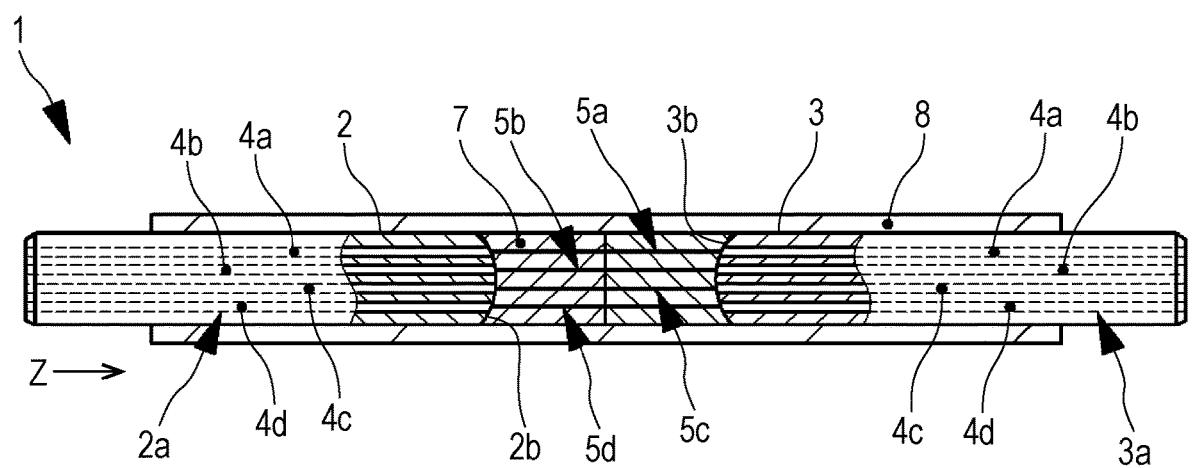
FIG. 9 is a partial sectional view showing a state in which the optical connector of FIG. 2 includes the split sleeve of FIG. 8.

In the optical connector 1, the ferrules 2, 3 are arranged facing each other in a split sleeve 8 shown in FIG. 8. The optical waveguides 5a to 5d are provided between the ferrule 2 and the ferrule 3. The n optical waveguides 5a to 5d are divided in half along a direction perpendicular to a light propagation direction (the Z-axis direction in FIG. 9). A division line is shown in FIG. 9. The core gap between adjacent ones of the optical waveguides 5a to 5d at the end surfaces thereof is the same among the divided optical waveguides 5a to 5d. Further, the flat end surfaces are connected to each other without any clearance in the perpendicular direction.

Two ferrules 2, 3 are inserted into and held in the single split sleeve 8, and therefore, can be arranged on the same axis and be arranged taking an inner diameter portion of the split sleeve 8 as a reference surface. Thus, positioning of two ferrules 2, 3 is facilitated.

In the case of using a sleeve for the optical connector 1, the split sleeve 8 is more preferable than a cylindrical sleeve because the photo-curing resin 10 can be poured into the sleeve.

Further, the method for manufacturing the optical connector 1 will be described with reference to FIGS. 10A to 10D. First, the ferrules 2, 13 are prepared, and the photo-curing resin 10 is prepared. As shown in FIG. 10A, two ferrules 2, 13 are both inserted into the split sleeve 8, and are arranged facing each other in the split sleeve 8. Further, a clearance is formed between the ferrule 2 and the ferrule 13. It may only be required that the clearance is set to dimensions necessary for forming the optical waveguides 5a to 5d, and the clearance is 1 mm as one example.

Next, as shown in FIG. 10B, the photo-curing resin 10 is poured into between the ferrule 2 and the ferrule 13 through a slit of the split sleeve 8, and is arranged between the ferrule 2 and the ferrule 13.

Next, as shown in FIG. 10C, light enters the end portions of the photo-curing resin 10 from each optical fiber 4a to 4d included in two ferrules 2, 13, and accordingly, the end portions of the photo-curing resin 10 are cured with the core gaps 2c1 to 2c3, 13c1 to 13c3. In this manner, the core gaps 2c1 to 2c3, 13c1 to 13c3 are transferred onto the photo-curing resin 10.

Further, the light enters the end portions of the photo-curing resin 10 from each optical fiber 4a to 4d, and in this manner, the n optical waveguides 5a to 5d are formed at the photo-curing resin 10 such that the variation in the core gap 13c1 to 13c3 on one end side of the optical waveguides 5a to 5d is smaller than the variation in the core gap 2c1 to 2c3 on the other end side. The end surface 13b is formed in the planar shape. Thus, the end surfaces of the optical waveguides 5a to 5d contacting the end surface 13b are also formed in a planar shape, and deformation of the end surface is eliminated. On the other hand, the end surface 2b is greatly deformed with the roundness from the planar state.

Thus, the end surfaces of the optical waveguides 5a to 5d contacting the end surface 2b are also deformed.

Next, the dads 7 are formed by curing of the photo-curing resin 10. Thereafter, as shown in FIG. 10D, the ferrule 13 is detached from the optical waveguides 5a to 5d. Such detachment is performed in such a manner that the ferrule 13 is pulled out of the split sleeve 8 in the Z-axis direction.

After detachment of the ferrule 13, another ferrule (e.g., the ferrule 3) and another photo-curing resin are prepared. Another ferrule is a ferrule including n optical fiber insertion holes and including optical fibers in the optical fiber insertion holes, the optical fibers being inserted therein. Further, the prepared another ferrule has variations in the angle of each hole of the ferrule in the axial direction (the Z-axis direction) and a gap between the cores of adjacent ones of the holes of the ferrule, and at an end surface thereof, has a roundness similar to that of the end surface 2b. Further, these various variations are equal to or greater than various variations of the ferrule 13.

As in FIG. 10A, the ferrule 13 and another ferrule are arranged facing each other in the split sleeve 8 (a state in which the ferrule 2 is replaced with another ferrule in FIG. 10A). Further, as in FIG. 10B, photo-curing resin is arranged between these two ferrules.

Light enters end portions of the photo-curing resin from each optical fiber of two ferrules to cure the end portions of the photo-curing resin with the above-described core gap between adjacent ones of the optical fibers, and in this manner, each core gap is transferred onto the photo-curing resin and n optical waveguides are formed at the photo-curing resin.

Next, dads are formed by curing of the photo-curing resin. Then, the ferrule 13 is detached from the formed self-forming optical waveguides. In this manner, another ferrule body is formed, which has a configuration similar to that of the ferrule body 14 of FIG. 10D and includes another ferrule and other self-forming optical waveguides.

The end portions, which were connected to the ferrule 13, of the ferrule body 14 and another ferrule body are formed with the same core gap 13c1 to 13c3. The ferrule 13 is, in advance, rotated and adjusted using a not-shown connector housing, and in this manner, the position of each optical fiber 4a to 4d is determined in such a manner that the ferrule 2 and the ferrule forming another ferrule body are connected to each other through a connector without rotation adjustment, these ferrules being assembled in the connector housing. Thus, as shown in FIG. 9, the optical waveguides 5a to 5d of these ferrule bodies can be connected to each other with a low loss at the same core gap 13c1 to 13c3.

Further, the end surface 13b is formed in the planar shape with no roundness in the direction perpendicular to the Z-axis direction. Thus, when the ferrule 2 and the ferrule 3 as another ferrule are connected to each other by connection of the end portions, which were connected to the ferrule 13, of these ferrules, a connection state with no spatial clearance as in FIG. 9 can be formed. Thus, on this point, the ferrule 2 and the ferrule 3 can be connected to each other with a low loss.

Further, the pre-detached ferrule 13 forms the optical waveguides 5a to 5d in a state in which the variation in the core gap on one end side of the optical waveguides 5a to 5d is smaller than the variation in the core gap on the other end side. Thus, a loss in connection among the optical waveguides 5a to 5d and the optical fibers 4a to 4d on one end side can be reduced. Further, use of the ferrule 2, 3 having the variation in the angle of each optical fiber insertion hole 2a, 3a in the axial direction, the variation in the gap (2c1 to 2c3, 3c1 to 3c3) between the center points of adjacent ones of the optical fiber insertion holes 2a, 3a, or the roundness of the end surface 2b, 3b is acceptable, and on the other hand, the optical connector 1 can include the optical waveguides 5a to 5d and the optical fibers 4a to 4d and the end portions of the optical waveguides 5a to 5d can be favorably connected to each other. Further, the connection loss can be easily reduced, and improvement in the yield of the optical connector 1 and reduction in a manufacturing cost accompanied by such improvement can be achieved.

Detachment of the ferrule 13 from the optical waveguides 5a to 5d can be implemented in such a manner that a mold release agent is applied to the exterior of the ferrule 13 in advance. With the applied mold release agent, the ferrule 13 can be smoothly detached from the optical waveguides 5a to 5d while loss of the end portions of the optical waveguides 5a to 5d upon detachment of the ferrule 13 is reduced.

The detached ferrule 13 is, as the master ferrule, repeatedly used for the step of manufacturing another ferrule body. The highly-accurate ferrule 13 with smaller various variations, the planar end surface 13b, and less deformation is detached and repeatedly used, and therefore, the ferrule body of which core gap between the end portions of adjacent ones of the optical waveguides 5a to 5d is the highly-accurate constant core gap (13c1 to 13c3) in the ferrule 13 can be duplicated. On this point, the connection loss of the optical connector can be easily reduced.

Figure 16A:
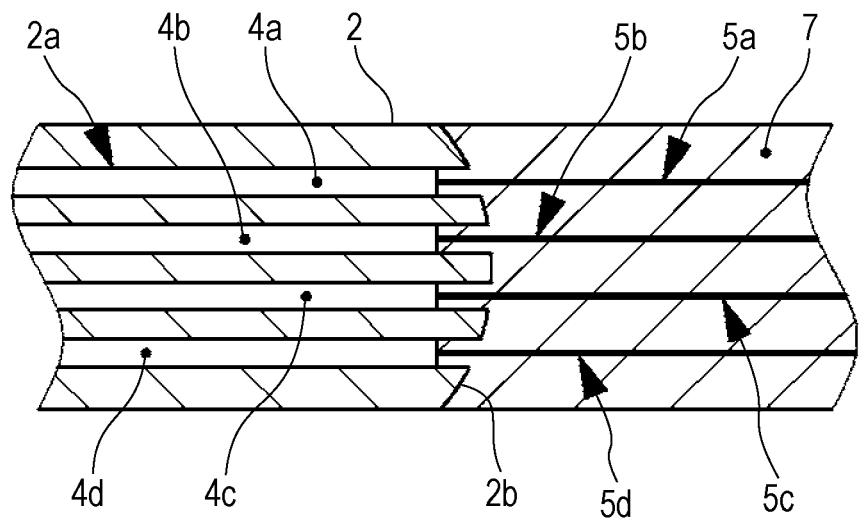
FIGS. 16A and 16B are partial views for describing still another modification example of the end surface of the ferrule used for the optical connector according to the embodiment of the present disclosure.
Figure 16B:
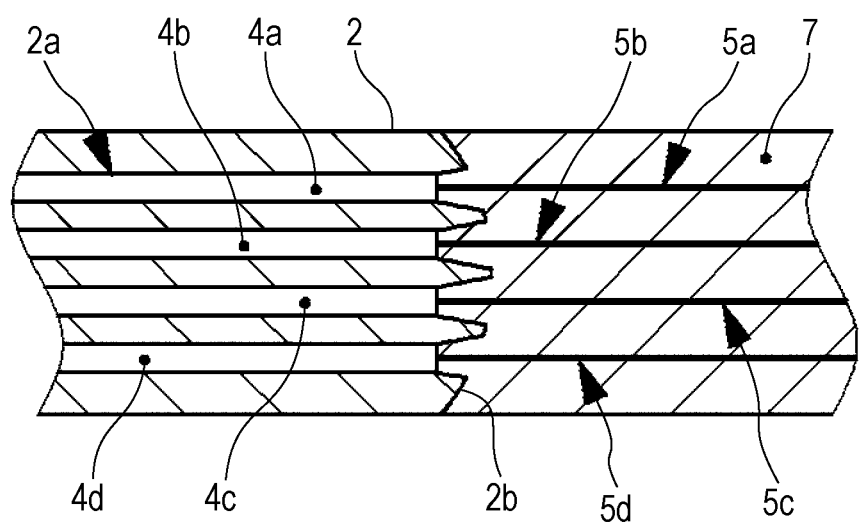

In the ferrule 2 for which it is not necessary to take detachment into consideration, the optical fibers 4a to 4d may be inserted and arranged in advance as shown in FIGS. 16A and 16B such that the end portions of all of the optical fibers 4a to 4d are retracted from the end surface 2b. In this case, the photo-curing resin may be poured into such retracted portions of the end surface 2b to optically connect the optical fibers 4a to 4d and the optical waveguides 5a to 5d to each other and form the dads 7.

Alternatively, as shown in FIGS. 14A, 14B, 15A, and 15B, the end surface 2b may be formed with a step such that a step portion 12, 12' is recessed from the end surface 2b. In this case, the end portions of all of the optical fibers may be formed retracted from the end surface 2b as the most-protruding end portion of the ferrule 2, and the step portion 12, 12' may be filled with the photo-curing resin 10. Even if it is not necessary to take detachment of the ferrule 3 into consideration, the structures shown in FIGS. 14A, 14B, 15A, 15B, 16A, and 16B are also applicable to the ferrule 3.

Further, an axis deviation correction part is formed at each optical waveguide 5a to 5d as indicated by dashed lines in FIGS. 7A to 7D. A dashed portion sandwiched by chain double-dashed lines at each optical waveguide 5a to 5d in FIGS. 7A to 7D is the axis deviation correction part. These figures show a case where the ferrule 2 is arranged on the left side. Each optical fiber 4a to 4d of the ferrules 2, 3, 13 has the variations in the angle in the core axial direction and the core gap (2c1 to 2c3, 3c1 to 3c3, 13c1 to 13c3), and at these optical fibers, the end surfaces 2b, 3b of the ferrules are formed with the roundness and are deformed. Thus, in the Z-axis direction, the optical fibers 4a to 4d of the ferrules 2, 3, 13 are not arranged on the same axis, and axis deviation is inevitably caused. For this reason, the axis deviation correction part is also inevitably formed upon formation of each optical waveguide 5a to 5d.

In the optical connector 1, the starting location 6a to 6d of the axis deviation correction part on a ferrule 2 side varies among the adjacent optical waveguides in the Z-axis direction in FIGS. 7A to 7D. FIGS. 7A to 7D show that formation of the starting location 6a of the optical waveguide 5a is started earlier than formation of the starting location 6b of the optical waveguide 5b. Moreover, it is shown that formation of the starting location 6b is started later than formation of the starting location 6c of the optical waveguide 5c. Further, it is shown that formation of the starting location 6c is started earlier than formation of the starting location 6d of the optical waveguide 5d. Note that focusing on the viewability of the starting locations 6a to 6d in FIGS. 7A to 7D, the axis deviation correction part is indicated by the dashed lines and is divided by the chain double-dashed lines. It does not mean that the optical waveguides 5a to 5d have such a structure that only the axis deviation correction part is an invisible part.

A difference in the starting location 6a to 6d is caused due to the variation in the angle of each optical fiber 4a to 4d in the core axial direction and the deformed end surface 2b, 3b with the roundness. That is, upon formation of the axis deviation correction parts by incident light from the fibers 4a to 4d of the ferrules 2, 3, 13, the angle of formation of the axis deviation correction part also varies. Thus, the light simultaneously enters from each optical fiber 4a to 4d without any time difference in entrance of the light from each optical fiber 4a to 4d, and in this manner, the starting location 6a to 6d can be differentiated among the adjacent optical waveguides. Further, since the starting location 6a to 6d is different among the adjacent optical waveguides, there can be a time difference in the time of end of formation of the axis deviation correction part among the adjacent optical waveguides.

Thus, use of the ferrule 2, 3, 13 with the variation in the angle of each hole in the axial direction or the variation in the gap between the center points of adjacent ones of the holes is acceptable, and on the other hand, optical connection among the adjacent optical waveguides 5a to 5d can be reduced. Thus, the connection loss of the optical connector 1 can be easily reduced.

When light exits from the n optical fibers 4a to 4d into the photo-curing resin 10, there is no need to provide a difference in exit time. Thus, reduction in the cost for manufacturing the optical connector 1 and improvement in the yield of the optical connector 1 can be achieved.

Note that substantially simultaneous entrance of the light from the optical fibers 4a to 4d is most preferable because there is no need to perform complicated entrance time control. Note that as long as a time difference in entrance of light from the optical fibers 4a to 4d is within two to three seconds, such a time difference is within an acceptable range at the manufacturing step.

The starting location of the axis deviation correction part on the ferrule 2 side has been described above. Instead, shift of a starting location on a ferrule 3 side (e.g., portions indicated by chain double-dashed lines on the right side in FIGS. 7A to 7D) may be taken into consideration.

Note that the angle of the ferrule 13 is rotated and adjusted in advance in the not-shown connector housing, and in this manner, positioning of the ferrule 2 and the ferrule 3 can be performed by connection between the ferrule 2 and the ferrule 3 through the connector without rotation adjustment.

Next, the optical connector 11 according to the second embodiment and the method for manufacturing thereof will be described with reference to FIGS. 10A to 10D, 11, and 12. Note that the same contents as those in the description above or the first embodiment will be omitted or simply described.

Figure 12:
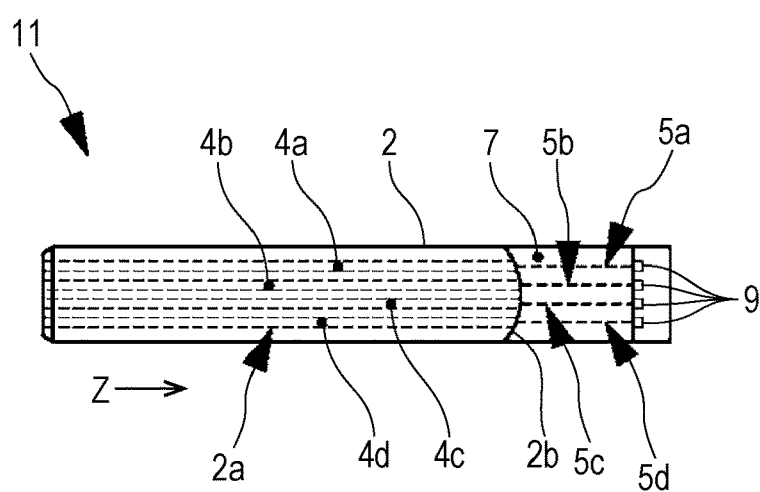
FIG. 12 is a schematic view of an optical connector according to a second embodiment of the present disclosure.
Figure 13A:
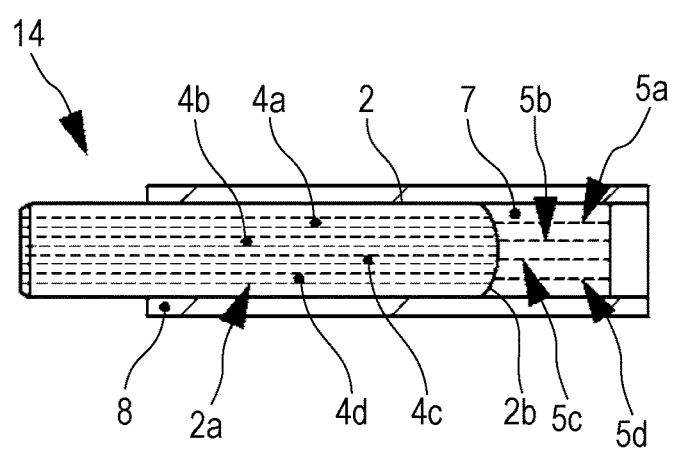
FIGS. 13A and 13B are partial sectional views schematically showing the method for manufacturing the optical connector according to the second embodiment of the present disclosure.
Figure 13B:
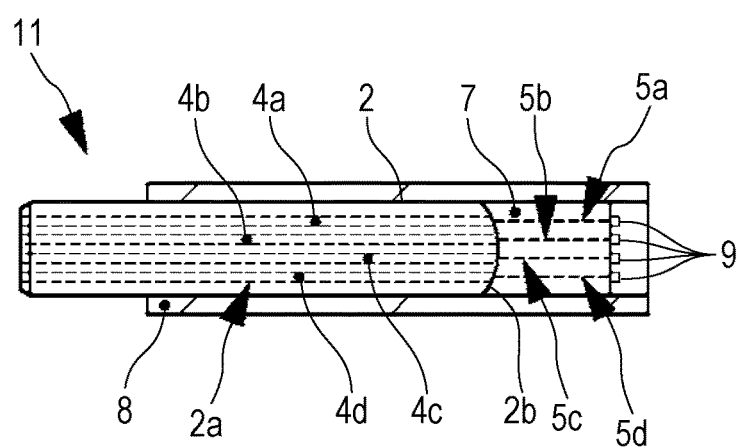
Figure 14A:
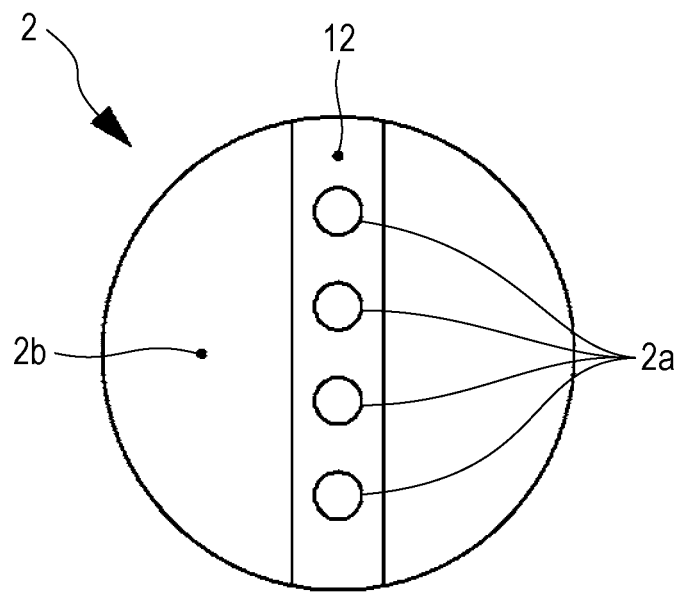
FIGS. 14A and 14B are partial views for describing a modification example of the end surface of the ferrule used for the optical connector according to the embodiment of the present disclosure.
Figure 14B:
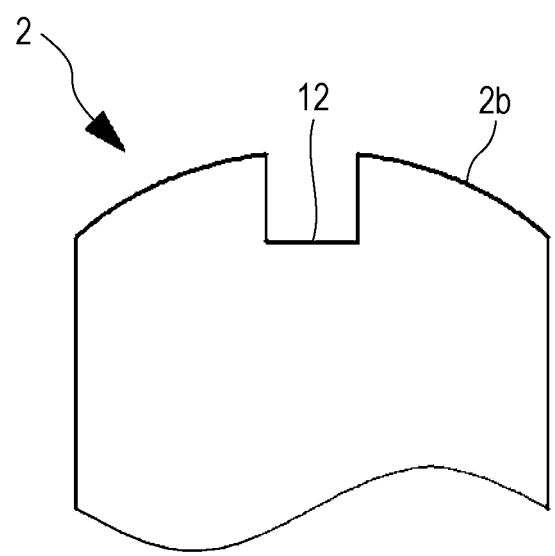
Figure 15A:
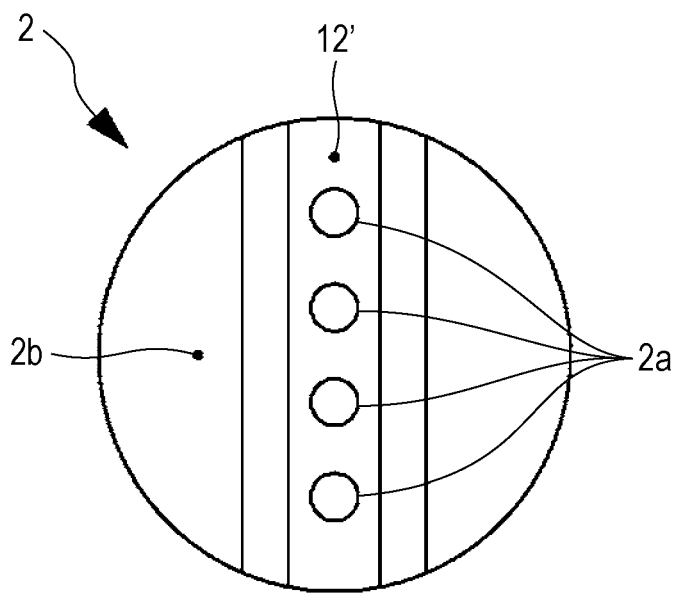
FIGS. 15A and 15B are partial views for describing another modification example of the end surface of the ferrule used for the optical connector according to the embodiment of the present disclosure.
Figure 15B:
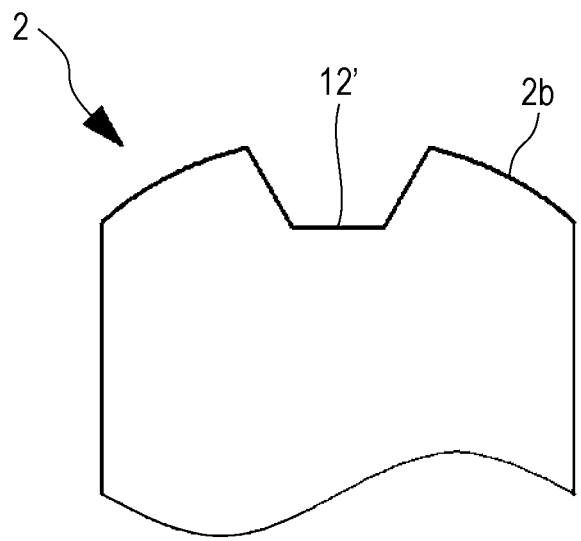

As shown in FIG. 12, the optical connector 11 includes one ferrule and optical elements 9, and includes the optical waveguides 5a to 5d among the optical elements 9 and the ferrule 2. The optical element 9 is, for example, a vertical cavity surface emitting laser (VCSEL), a light-emitting diode, a laser diode, or a photodiode.

The array of the optical elements 9 and the ferrule 2 are held in the single split sleeve 8. The array of the optical elements 9 and the ferrule 2 are inserted into and held in the single split sleeve 8, and therefore, the optical elements 9 and the optical fibers 4a to 4d can be arranged on the same axis and the inner diameter portion of the split sleeve 8 can be taken as the reference surface. Thus, positioning of the optical elements 9 and the ferrule 2 is facilitated.

Further, the method for manufacturing the optical connector 11 will be described with reference to FIGS. 10A to 10D, 13A, and 13B. First, the ferrule body 14 is produced according to the description of FIGS. 10A to 10D above. The produced ferrule body 14 is shown in FIG. 13A. As shown in FIG. 10D or 13A, a ferrule body including at least one ferrule and optical waveguides is also referred to as an optical connector in the present embodiment.

Next, the array of the optical elements 9 such as VCSELs is prepared, and is also inserted into the split sleeve 8. Then, as shown in FIG. 13B, the optical waveguides 5a to 5d and the optical elements 9 are optically connected to each other. In this manner, the optical connector 11 is produced. Note that in the description of the method for manufacturing the optical connector 11, the length of the split sleeve 8 is different between FIGS. 10D and 13A, but these sleeves are taken as the same sleeve for the sake of convenience in description. The detached ferrule 13 is, as the master ferrule, repeatedly used for the step of manufacturing another ferrule body. The optical connector 11 has advantageous effects similar to those of the optical connector 1.

In the above-described embodiment, the structure in which the clearance is provided in the split sleeve and the photo-curing resin is arranged in this clearance has been described with reference to FIGS. 10A to 10D. On this point, the gap between the ferrules is set to such a gap that the photo-curing resin can be, due to the surface tension thereof, held between the ferrules, and in this manner, the method for manufacturing the optical connector and the configuration of the optical connector without use of the split sleeve 8 can be also achieved.

Hereinafter, an example according to the present embodiment will be described. Note that the technique of the present disclosure is not limited only to the following example.

Example

An optical connector according to the present example has the structure shown in FIG. 9. Optical waveguides 5a to 5d were formed according to FIGS. 10A to 10C described above. After formation of the optical waveguides 5a to 5d, the optical waveguides 5a to 5d were left for two minutes to promote monomer interdiffusion at a boundary surface between a core and a clad. Thereafter, dads 7 were formed by UV irradiation.

In this manner, ferrule bodies 14 were duplicated, and at end portions of the optical waveguides 5a to 5d, were optically connected to each other. In this manner, the optical connector 1 having the structure of FIG. 9 was manufactured.

After formation of the optical connector 1, light with a wavelength of 850 nm propagated from each optical fiber 4a to 4d to each optical waveguide 5a to 5d. At this point, an optical connection loss between a ferrule 2 and a ferrule 3 was measured.

On the other hand, an optical connector of a comparative example was formed in such a manner that an end surface 2b of a ferrule 2 and an end surface 3b of a ferrule 3 are brought into surface contact with each other with no optical waveguides 5a to 5d and no clads 7 in the configuration shown in FIG. 9. In the comparative example, light with a wavelength of 850 nm also propagated in each optical fiber 4a to 4d, and an optical connection loss between the ferrule 2 and the ferrule 3 was also measured.

Improvement values of the connection loss in the example as compared to the comparative example are shown in Table 1. Table 1 shows that in two cases, i.e., both of the case of an optical waveguide length of 50 μm and the case of an optical waveguide length of 200 μm, the connection loss has been improved in light propagation paths of all of the optical fibers 4a to 4d. Note that the optical waveguide length is the length of each optical waveguide 5a to 5d in the Z-axis direction of FIG. 9.

TABLE 1

|  | Optical Waveguide | Connection Loss Improvement Value (dB) |
| --- | --- | --- |
| Optical Waveguide Length: 50 μm | 5a | +0.53 |
|  | 5b | +0.36 |
|  | 5c | +0.41 |
|  | 5d | +0.73 |
| Optical Waveguide Length: 200 μm | 5a | +2.54 |
|  | 5b | +2.55 |
|  | 5c | +1.65 |
|  | 5d | +1.95 |

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical connector comprising:
at least a ferrule and n self-forming optical waveguides, wherein the ferrule includes n optical fiber insertion holes, and optical fibers are each inserted into and included in the optical fiber insertion holes,
the number n is four or six,
there are variations in an angle of each optical fiber in a core axial direction and a core gap between adjacent ones of the optical fibers,
an end surface of the ferrule is formed with roundness,
end portions of the self-forming optical waveguides are each optically connected to the optical fibers, and
a variation in the core gap on one end side of the self-forming optical waveguides is smaller than a variation in the core gap on other end side of the self-forming optical waveguides, the other end side of the self-forming optical waveguides being in direct contact with the end surface of the ferrule, the one end side of the self-forming optical waveguides being opposite to the other end side of the self-forming optical waveguides in the core axial direction.

2. The optical connector according to claim 1, wherein the ferrule includes two ferrules, the two ferrules are arranged facing each other, and the self-forming optical waveguides are provided between the two ferrules,
each of the two ferrules includes n optical fiber insertion holes, and the optical fibers are each inserted into and included in the optical fiber insertion holes,
there are variations in an angle of each optical fiber in a core axial direction and a core gap between adjacent ones of the optical fibers,
end surfaces of the two ferrules are formed with roundness,
the n self-forming optical waveguides are divided in half along a direction perpendicular to a light propagation direction, and
a core gap between adjacent ones of the self-forming optical waveguides at end surfaces thereof is identical among the divided self-forming optical waveguides.

3. The optical connector according to claim 1, further comprising:
an optical element,
wherein the self-forming optical waveguides are provided between the optical element and the ferrule.

4. The optical connector according to claim 1, wherein a starting location of an axis deviation correction part of each self-forming optical waveguide on a ferrule side is different between adjacent ones of the self-forming optical waveguides.

5. The optical connector according to claim 1, wherein the ferrule is held in a single split sleeve.

6. An optical connector manufacturing method comprising:
preparing a first ferrule, a second ferrule and photo-curing resin, each of the first ferrule and the second ferrule including at least n optical fiber insertion holes and including optical fibers in the optical fiber insertion holes, the optical fibers being inserted therein, wherein there are variations in an angle of each optical fiber in a core axial direction and a core gap between adjacent ones of the optical fibers, an end surface of the first ferrule is formed with roundness, an end surface of the second ferrule is formed with no roundness, and a variation in second core gaps between the adjacent ones of the optical fibers of the second ferrule is smaller than a variation in first core gaps between the adjacent ones of the optical fibers of the first ferrule;
arranging the first and second ferrules such that the end surface of the first ferrule and the end surface of the second ferrule face each other and arranging the photo-curing resin between the first and second ferrules;
curing end portions of the photo-curing resin with core gaps by incident light entering the end portions of the photo-curing resin from the optical fibers, thereby transferring the first and second core onto the photo-curing resin and forming n self-forming optical waveguides at the photo-curing resin such that a variation in the core gap on one end side of the self-forming optical waveguides is smaller than a variation in the core gap on other end side of the self-forming optical waveguides, the one end side of the self-forming optical waveguides being in direct contact with the end surface of the second ferrule, the other end side of the self-forming optical waveguides being in direct contact with the end surface of the first ferrule;
forming a clad by curing of the photo-curing resin; and detaching the second ferrule from the self-forming optical waveguides, thereby forming a ferrule body including the first ferrule and the self-forming optical waveguides, wherein the number n is four or six.

7. The optical connector manufacturing method according to claim 6, further comprising:

preparing a third ferrule and another photo-curing resin, the third ferrule including n optical fiber insertion holes and including optical fibers in the optical fiber insertion holes, the optical fibers inserted therein;

further forming other self-forming optical waveguides by the optical connector manufacturing method by means of the detached second ferrule;

forming another ferrule body including the third ferrule and the other self-forming optical waveguides; and optically connecting the self-forming optical waveguides and the other self-forming optical waveguides to each other.

8. The optical connector manufacturing method according to claim 6, further comprising:

preparing an optical element; and optically connecting the self-forming optical waveguides and the optical element to each other.

9. The optical connector manufacturing method according to claim 6, further comprising:

differentiating a starting location of an axis deviation correction part of each self-forming optical waveguide on a side close to the first ferrule between adjacent ones of the self-forming optical waveguides, and providing a time difference in a time of end of formation of the axis deviation correction part between adjacent ones of the self-forming optical waveguides.

10. The optical connector manufacturing method according to claim 6, further comprising:

causing light to simultaneously enter the photo-curing resin from the n optical fibers.

11. The optical connector manufacturing method according to claim 6, further comprising:

applying a mold release agent to the second ferrule in advance.

12. The optical connector manufacturing method according to claim 6, further comprising:

holding the first and second ferrules in a single split sleeve.

* * * * *